E. C. PLIMPTON & S. TAYLOR.
Improvement in Chucks for Screw Cutting Lathes.
No. 123,197. Patented Jan. 30, 1872.
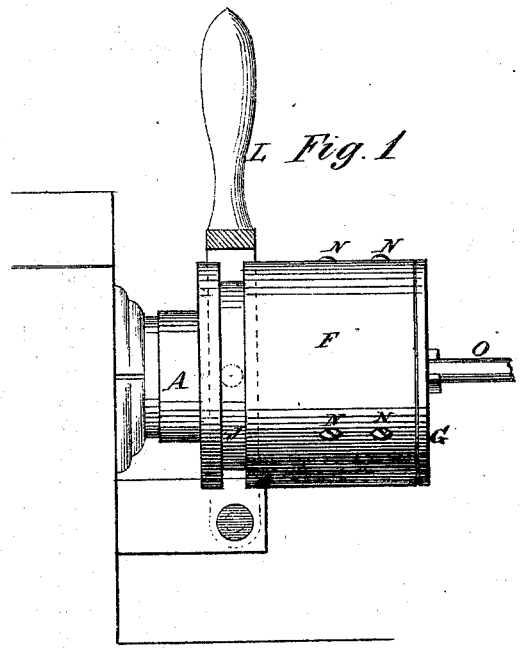
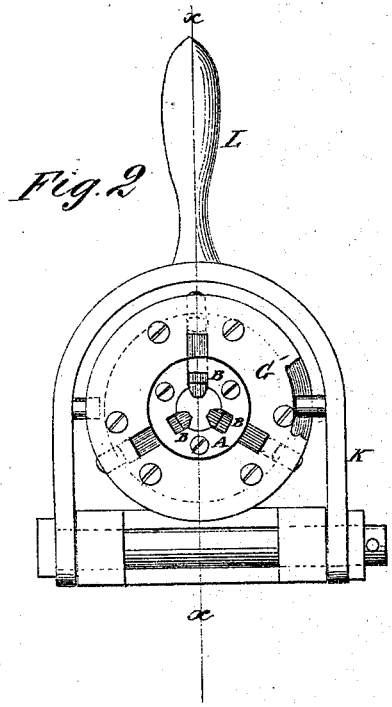
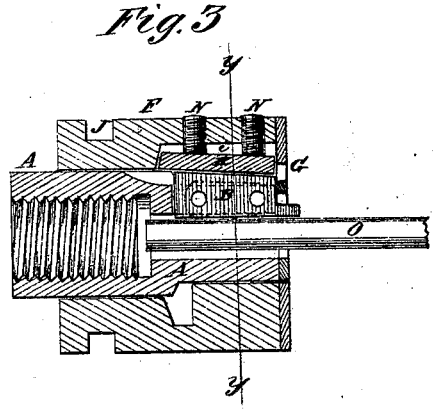
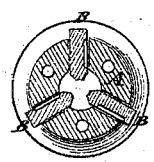
Witnesses:
A. W. Almqvist
Geo. W. Mabee
Inventor:
E. C. Plimpton
S. Taylor
Per
Attorneys.

UNITED STATES PATENT OFFICE.

EUGENE C. PLIMPTON AND SAMUEL TAYLOR, OF BRIDGEPORT, CONN.

IMPROVEMENT IN CHUCKS FOR SCREW-CUTTING LATHES.

Specification forming part of Letters Patent No. 123,197, dated January 30, 1872.

Specification describing a new and useful Improvement in Adjustable Chucks, invented by EUGENE C. PLIMPTON and SAMUEL TAYLOR, of Bridgeport, in the county of Fairfield and State of Connecticut.

This invention relates to a class of chucks which are ordinarily used for cutting screws, but which may be used for other purposes; and consists in the mode of operating the chuck, and of making the dogs of the chuck adjustable, so that a larger or smaller piece of metal may be admitted and worked.

In the accompanying drawing, Figure 1 represents a side view of the chuck as when in use. Fig. 2 is an end or face view. Fig. 3 is a longitudinal section of Fig. 2, taken on the line $x\,x$. Fig. 4 is a cross-section of the central portion of the chuck, on the line $y\,y$ of Fig. 3. Fig. 5 is a side view of one of the dogs detached. Fig. 6 is a section of Fig. 5, on the line $z\,z$, showing the spring, by means of which the dog is kept in position when the chuck is empty.

Similar letters of reference indicate corresponding parts.

A is that portion of the chuck which is screwed onto the lathe-mandrel, and which carries the dogs B. These dogs B are placed in slots in the part A, as seen in Fig. 4, and will slide to or from the center; but are held in position, or prevented from slipping to the center by the springs C on the sides of the dogs. The inner edges D of these dogs are parallel with the spindles of the lathe. The outer edges $e$ are inclined planes, as seen in Fig. 3. F is a cylindrical fastener, which is made to slide on the part, A. Over its face end is an annular plate, G, which is screwed on, as seen in Fig. 2, so as to hold the dogs in place longitudinally in their respective slots. The forward portion of this fastener is slotted to receive the loose sliding plates H. $i$ represents the slots, which in position exactly correspond with the dogs. These plates H are held in their respective slots by the end plate G, and rest on the inclined sides of the dogs, as seen in Fig. 3. The fastener F is moved on the part A by means of groove J therein, and a shifting band and lever, K L, seen in Figs. 1 and 2. N represents one or more adjusting-screws, for each of the plates H. By means of these screws the plates are held to the inclined backs of the dogs, as seen in Fig. 3. As the fastener is moved longitudinally, the plates slide on the dogs, and owing to their inclined position, they force the dogs toward the center of the chuck, so that they gripe the rod O, upon which the work is to be done, and hold it fast, as do the dogs of the ordinary chuck. The chuck which we are describing, is designed expressly for cutting small screws or doing similar work. The mandrel of the lathe is tubular, and the rod or wire O is fed through the chuck automatically, by means of a weight or spring at the tail of the mandrel against an adjustable stop in front, so that when a screw is cut off, the wire shoots forward just the right distance for another, and so on, until the rod or wire is used up. Now, the whole rod or a whole coil of wire may be used up in this chuck without stopping its revolving motion. When a screw is completed, the operator throws the fastener F forward a very little, by means of the lever L, which loosens the gripe of the dogs upon the wire, allowing the wire or rod to be forced forward, as before described. When it is desired to change the size of the wire, the dogs are adjusted to that wire by means of the screws N. With the ordinary chuck used for this and other purposes, it is necessary to stop the lathe for every screw or piece of work performed. With this chuck the lathe may run all day, while the artisan cuts his screws and works the lever L back and forth.

We do not confine ourselves to the precise form or arrangement of any of the parts described, as they may be varied without departing from our invention.

Having thus described our invention, we claim as new, and desire to secure by Letters Patent—

1. In combination, with the dog B, the plate H, and adjusting-screw N, as and for the purposes described.

2. The sliding fastener F, plates H, and adjusting-screws N, in combination with the band K and lever L, as shown and described.

EUGENE C. PLIMPTON.
SAMUEL TAYLOR.

Witnesses:
SAMUEL H. WORTMAN,
EDWARD FLATHER.